(12) United States Patent
Sekizawa et al.

(10) Patent No.: US 6,987,587 B2
(45) Date of Patent: Jan. 17, 2006

(54) MULTIPLE RECOGNITION IMAGE PROCESSING APPARATUS

(75) Inventors: Hidekazu Sekizawa, Yokohama (JP); Sunao Tabata, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 849 days.

(21) Appl. No.: 09/955,291

(22) Filed: Sep. 19, 2001

(65) Prior Publication Data

US 2003/0053087 A1    Mar. 20, 2003

(51) Int. Cl.
*B41B 1/00* (2006.01)
*G06F 15/00* (2006.01)

(52) U.S. Cl. ..................... 358/1.9; 358/1.16

(58) Field of Classification Search ............. 358/1.9, 358/504, 537–538, 462, 450, 404, 453, 540, 358/1.14; 382/238
See application file for complete search history.

(56) References Cited

U.S. PATENT DOCUMENTS

| 4,926,251 A | 5/1990 | Sekizawa et al. ............. 358/75 |
| 5,420,694 A * | 5/1995 | Matsumoto ................. 358/462 |
| 6,342,950 B1 | 1/2002 | Tabata et al. ................ 358/1.6 |
| 2001/0013944 A1 * | 8/2001 | Nagasawa et al. ......... 358/1.14 |
| 2001/0016065 A1 | 8/2001 | Yamamoto et al. ......... 382/173 |
| 2002/0090137 A1 * | 7/2002 | Nakayama .................. 382/238 |

FOREIGN PATENT DOCUMENTS

| JP | 7-95149 | 4/1995 |
| JP | 11-213152 | 8/1999 |

* cited by examiner

*Primary Examiner*—Kimberly Williams
*Assistant Examiner*—Charlotte M. Baker
(74) *Attorney, Agent, or Firm*—Foley & Lardner LLP

(57) ABSTRACT

An image processing apparatus comprising a region recognition section for reading out the given image information and simultaneously creating the region recognition signal, a memory element for storing the image information in the page memory together with the created region recognition signal, a region recognition modifying processing section for reading out and modifying the region recognition signal, and a modifying section for reading out the image information and modifying the image information in compliance with the region recognition signal modified.

16 Claims, 6 Drawing Sheets

MULTIPLE RECOGNITION IMAGE PROCESSING APPARATUS

BACKGROUND OF THE INVENTION

The present invention relates to an image processing apparatus with the image memory including copying machines and printers.

Recently, as the image memory price lowers, the image processing apparatus that handles image data of copying machines, printers, etc. have been developed and popularized. Under these circumstances, a large number of image processing apparatus that detects regional recognition signals of image information to be processed and carries out image processing accordingly have been used.

For example, for conventional arts of the image processing apparatus related to the present invention, in U.S. patent application Ser. No. 09/136,929, there is disclosed a method and an apparatus for carrying out the high-accuracy recognition by obtaining the information on the macro region by pre-scanning before obtaining the printing data, recognizing the region from the layout information, and merging the information with the local region recognition during final scanning for obtaining the printing data. In this method, high-accuracy region recognition is possible, but has a problem of complying high-speed processing because pre-scanning must be carried out, etc. In addition, there is a trouble in that the resolution improving function is not supported when the data is printed out.

Furthermore, in U.S. patent application Ser. No. 09/138,284, there is disclosed a compressing method with region recognition signal merged with image data, but the image data and region recognition signal are completely synthesized and the method has a problem of being not suited for taking out the image region recognition signal only and correcting errors. In addition, in the compression method such as JPEG, etc., when high-definition image is high-compressed, a trouble is known in that the resolution is degraded more than in the case when the low-resolution image is compressed to the same data capacity of the compressed image of the high-definition image.

As described above, it is clear that with the apparatus indicated by these cited documents, when a specified image information is image-processed, it is difficult to highly accurately recognize the region unless the macro-region information on the image information is obtained. However, to carry out pre-scanning in order to obtain macro information, there is a problem in that it becomes difficult to increase the image processing speed as much as the time required for pre-scanning.

BRIEF SUMMARY OF THE INVENTION

It is an object of the present invention to provide an image processing apparatus which obtains the high-resolution image information at a high speed by simultaneously carrying out reading of original document image and region recognition processing of the read original document image by one scanning of original document image without carrying out pre-scanning.

The present invention relates to an image processing apparatus comprising the first memory section which stores the given image information in the page memory, a region recognition section which generates the region recognition signal of the image information simultaneously with storing of the first memory section, the second memory section which stores the region recognition signal generated by the region recognition section in the page memory, a recognized signal modifying section which reads and modifies the region recognition signal which the second memory section stores, and a high-definition modifying section which reads the image information which the first memory section stores and modifies the image information in compliance with the region recognition signal which the recognition signal section modified.

An image processing apparatus related to the present invention reads and stores the given original document image simultaneously with recognizing the region of the original document image, and generates and stores the region recognizing signal. By this, it is possible to provide an image processing apparatus that can obtain the image processing results quickly and in excellent picture quality by carrying out proper image processing in accordance with the region recognition results by one scanning without giving time to pre-scanning as the conventional apparatus.

DETAILED DESCRIPTION OF THE INVENTION

Referring now to drawings, the embodiments of the present invention will be described in detail as follows.

<First Embodiment>

Figure 1:
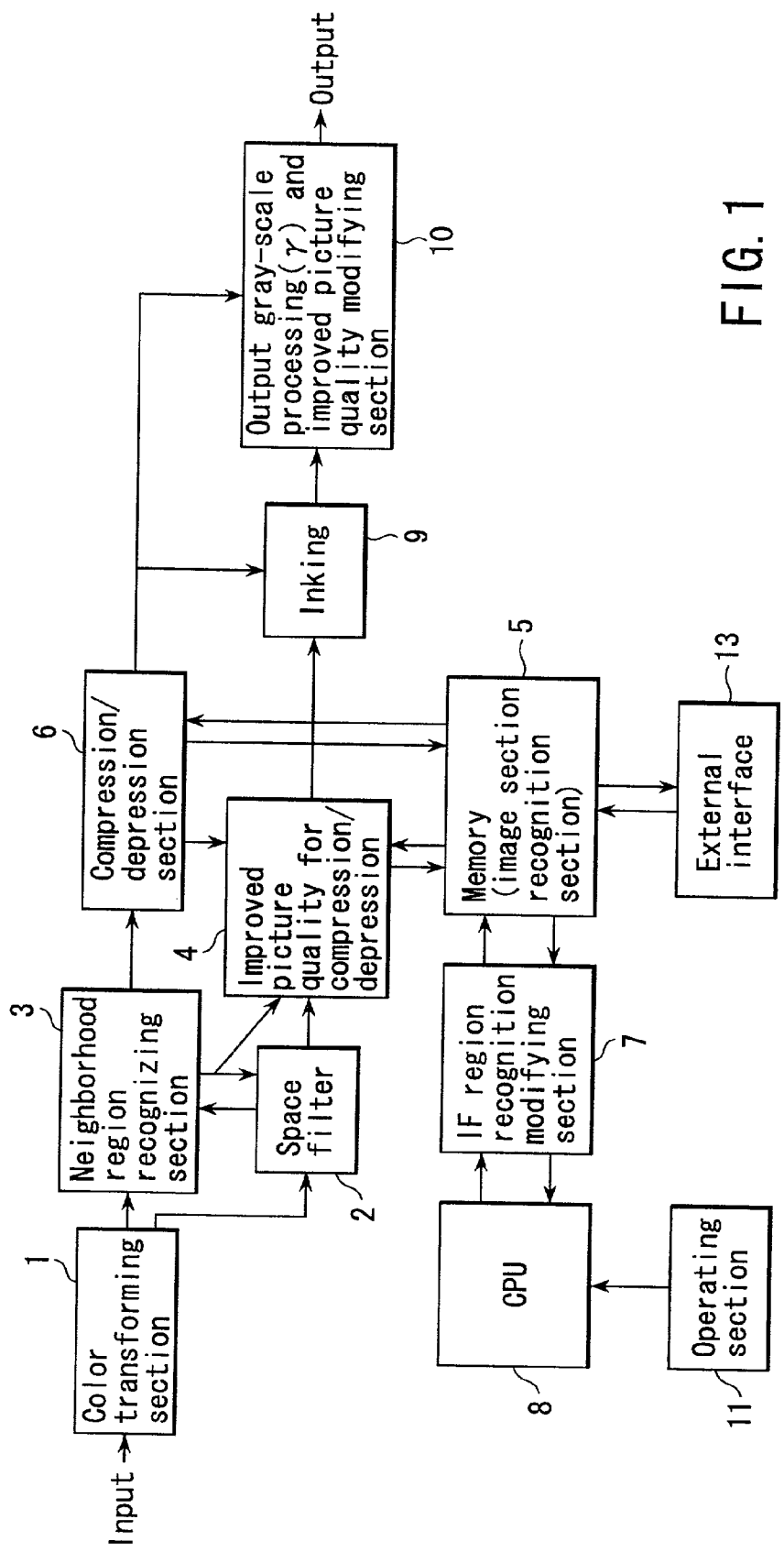
FIG. 1 is a block diagram showing a configuration example of a first embodiment according to the present invention.

A first embodiment is identified by FIG. 1, which provides an image processing apparatus characterized in that the original document image is taken in by a scanner and the image information is stored in the page memory, while the region recognition signal of the image information is simultaneously generated and stored in the page memory, and then, the specified image processing is carried out in conformity to this region recognition signal.

The construction and action of the image processing apparatus related to the first embodiment according to the present invention will be described in detail as follows. FIG. 1 is a block diagram showing a configuration example of the first embodiment of the image forming apparatus related to the present invention, and in FIG. 1, the image forming apparatus related to the present invention comprises a color transforming section 1 to which image information, etc. of the original document image is entered, space filter 2 which is connected to the color transforming section 1 and a neighborhood region recognizing section 3 which is connected to the color transforming section 1 in the same manner. From a scanner not illustrated, the RGB signal is read and entered in the color transforming section 1. The color transforming section 1 transforms the original document image into ink colors YMCK of the image forming apparatus (printer) based on the RGB signal. Specifically, this transformation processing takes place by interpolation with inputted three-dimensional table four colors YMCK that correspond to inputted RGB in the 3-inputs-4-outputs transformation system.

The signal transformed to YMCK by color transformation has the high-pass emphasized by the space filter 2. On the other hand, the signal transformed to YMCK simultaneously is entered in the neighborhood region recognizing section 3 that primarily intends to detect the edge. The neighborhood region recognizing section 3 emphasizes the section where sharpness of the edge section should be emphasized in the character image and natural drawing (to prevent blurring due to lenses at the time of reading or degradation of sharpness at the not illustrated image forming apparatus) and detects the edge section for such purpose.

The edge section which should not be emphasized (edges of screened halftone dots of screened halftone image, etc.) is set slightly to rather low pass for reducing noise. This kind of control signal of space filter is generated in this neighborhood region recognition 3 and sent to the space filter 2, and sharpness of the edge section is improved and noise is reduced.

However, because at this point, the signal for controlling this space filter 2 primarily recognizes the edge component in the neighborhood region, it is unable to completely distinguish, for example, screened halftone structure and microscopic character, and there is a possibility to emphasize part of screened halftone noise or smoothen part of microscopic character. Therefore, the space filter 2 comparatively reduces the high-frequency portion contained in the character section. In this way, the picture quality is improved. Consequently, the space filter 2 carries out the picture quality improvement such as removing the frequency of screened halftone areas but emphasizing the profile of the character portion using a comparatively large size space filter such as 13 pixels×13 pixels, etc. By the way, at this point, no strong emphasis (improvement) is carried out.

The signal with the picture improved by this space filter 2 has the image compressed at the image compression processing section 4. For this compression processing, for example, the method recited in U.S. patent application Ser. No. 09/138,284 may be used, but needless to say, the well-known JPEG (Joint Photographic Coding Experts Group) technique may be used. In the method recited in U.S. patent application Ser. No. 09/138,284, it is recited that the picture quality could be improved by compressing after receiving the recognition signal as to whether it is the character edge or halftone area when compression processing is carried out. Then, the compressed signal is stored into the memory element 5.

On the other hand, the signal outputted at the neighborhood region recognizing section 3 is compressed at the compression/depression section 6 for recognized signals. Since the characters and halftone areas exist in a block with a specified size, the recognized signals can be sufficiently compressed by transforming them simply into run-length signals. In such event, there is no case in the actual image that extremely small photographic image exists, for example, between character image dots, or extremely small character images exist between photographic images, and these must be judged as noise, and processing for removing this kind of noise portion of the recognition signal.

It is useful for further improving the picture quality to control the image compression/depression and improving picture quality section 4 by the signal with this kind of noise removed. The recognition signal with noise removed in this way is also stored in the recognition section of memory element 5.

The image region recognition signal stored in the recognition section of memory element 5 recognizes whether the region is the character region or photograph region (including screened halftone areas) by the neighborhood image dots characteristics only. Consequently, at the edge section of the photograph region, etc., it is difficult to distinguish the character region edge and errors may result. Therefore, the recognition errors as mentioned above can be remarkably reduced by observing the layout of the whole image and determining whether it is the character region or photograph region by judging, for example, arrangement of characters, etc. For this kind of system, macro region recognition (recited in U.S. patent application Ser. No. 09/136,929) is effective.

In the publication, characteristic extraction comprising the histogram is carried out at the image segregation section for macro region recognition, but in the present case, the layout analysis is carried out on the basis of the recognition (micro recognition) signal of the neighborhood image dots, and macro recognition is carried out. That is, through the interface region recognition modifying section 7, the layout analysis is carried out by CPU 8, and the image recognition comprising the macro region will be carried out. In this way, the macro region recognized signal (photograph edge section is modified to the photograph based on the layout information and characters in the screened halftone image are also re-recognized) and modified recognition signals are stored in the recognition section of the memory element 5 again. The region recognition signal with compressed image signal and micro recognition signal stored in the memory element 5 modified by layout analysis has the compressed image signals entered the compression/depression section 4 entered, respectively, or the region recognition signal entered in the compression/depression section 6 of the region signal.

And the compressed image signal is depressed at the compression/depression section 4, but in such event, the modified region signal is entered from the region signal compression/depression section 6 to the compression/depression section 4, and is depressed with picture-quality improved. That is, by compressing and depressing the image data, the memory capacity can be saved and at the same time, various kinds of processing can be carried out at high speed.

The depressed image signal is entered in the inking section 9, and the YMCK signal is generated from the YMC signal. In such event, the black image and character is processed as a black character and signal processing different from regular inking is carried out. The inked signal is entered into the output gray-scale processing section 10 and γ characteristics are processed differently in accordance with characters and halftones, and the signal is outputted. Finally, this image information is transferred to a not-illustrated printer, an image is formed on the printing paper on the basis of this image information, and is outputted.

As described in detail above, the image processing apparatus according to the present invention related to the first embodiment provides image processing to the image information entered. Because the region recognition is carried out with micro recognition signal (region recognition in conformity to neighborhood image information) of one screen received, remarkably high-accuracy region recognition is enabled. Furthermore, the apparatus can achieve image processing that simultaneously enables increased speed and improved accuracy by carrying out inking, gradation, modification for improving picture quality quickly and faithfully in compliance with the region recognition results, through simultaneously taking in original document image and recognizing the region by one scanning without carrying out scanning twice, prescanning for region recognition of the original document image and then final scanning of the original document image, as is the case of the conventional apparatus.

(Modified Example of the First Embodiment)

The first embodiment as described above can obtain the corresponding working effects by providing various modifications as described below.

First of all, a method for achieving improved picture quality using the density histogram is described. That is, the image signal is entered by the scanner, color-transformed, micro-recognized, noise-removed, and recognized for high-pass emphasizing. By this recognition signal, in the space filter 2, noise removal and high-pass emphasis are carried out, compression of image data is optimized in accordance with the recognition, and compressed and stored in the image memory (the high-pass component main portion is stored in the high pass and the image data other than that is compressed by gray scale preservation parameters and stored). Simultaneously, the density histogram of the high-pass main portion and the density histogram of the portion other than that are created.

On the other hand, the recognition signal is compressed (including simple packing) with the processing during compression (modification of error recognition, vertical-horizontal transformation) taken into account and stored in memory.

The stored recognition signal undergoes processing such as concatenation correction, etc. (macrorecognition) to reduce erroneous recognition. By this recognition signal and histogram signal, the edge section, flat section, intermediate section of the photographic section, edge section, flat section, intermediate section of the character section, color character or black character, existence of background, etc. are recognized and the recognition signal is generated and stored.

At the time of depression, high-pass emphasizing, smoothing, γ-characteristics control, inking control, and line width control (expansion/shrinkage processing) are carried out by these recognition signals to improve the picture quality. When the printer is operating, the attribute information is stored as recognition signal, transformed into modified microsignal (signal for storage control), and the picture quality is improved simultaneously with depressing the compressed image at the time of outputting. The detailed compression method can be known by referring to U.S. patent application Ser. No. 09/138,284 (Tabata at Toshiba).

Next, as the other method for improving the picture quality, a method for using the macroregion recognition (using CPU8 via the interface region recognition modifying section 7) as described above will be discussed. This is the signal modified by the use of the layout signal generated by the macroregion recognition, and the image information is transformed to match with the printer characteristics. Specifically, the macroregion recognition is to recognize the character section, photograph section, and screened halftone section in accordance with the microrecognition signal and further on the basis of the layout, but to obtain the still better picture quality, for example, if the background is the screened halftone on which characters are drawn (characters on screened halftone background), there is a method for removing screened halftone noise and for emphasizing the characters at the screened halftone image section. In such event, overlaying the character image over the image with screened halftone removed can construct a remarkably natural image. That is, still better picture quality is achieved by transforming the region recognition signal into the printing control signal and by forming the image by this printing control signal. In such event, the recognition region signal is modified in such a manner to overlay the character image region signal over the screened halftone region signal by CPU8 via the interface region recognition modifying section 7. Compressing and depressing the image signal by the compression/depression circuit 4 using this modified region signal achieves improved picture quality that meets the printing characteristics. The processing thereafter is the same as that described in the embodiment mentioned above.

Next discussion will be made on the method for improving the processing speed by varying the resolution of the region recognition signal from that of the image information. That is, processing the region signal at the resolution similar to that for the image signal increases loads to CPU. That is, it takes time for processing, causing practical problems of the image processing apparatus. Therefore, a thinning signal is generated at the interface region recognition modifying section 7, and the region recognition signal is processed at the resolution coarser than that of the image information, thereby increasing the speed of modification processing of the region recognition signal and saving the memory capacity of the region recognition signal.

Next description will be made on the method for improving the compression efficiency of the region recognition signal by providing a compression means not illustrated, which is different from the image information compressing means. That is, the image information to be processed and the region recognition signal are not always necessary to be compressed by the same compressing means, but may be compressed by independent dedicated compressing means, and by this, it becomes possible to apply a standard image information compressing method and further to freely design the number of bits of the recognition signal, thereby achieving still better image quality.

That is, in the above-mentioned embodiment, the image signal can be compressed by, for example, JPEG, while the image region recognition signal can be compressed by run-length transformation. By independently transforming the image signal and recognition signal independently and respectively, the bits can be freely allotted, respectively. For example, allotting three bits to the recognition signal enables 8 kinds of recognition. For example, black character on uniform background, color character on uniform background, black character on screened halftone background, color character on screened halftone background, photograph section, and screened halftone photograph section can be recognized. In addition, for example, when the black and white mode is set by the operating section (control panel) 11, changes of recognition signal to 2 bits, etc. can be flexibly met. The case includes the character on uniform background, character on screened halftone background, photograph, screened halftone photograph, etc.

Next discussion will be made on the method for improving accuracy of the region recognition signal by carrying out correction of the region recognition signal by utilizing the page-by-page feature amount. That is, in the neighborhood region recognizing section 3, the region recognition signal is likely to be judged by the threshold value processing. In such event, depending on images, it is better to reduce erroneous recognition by changing the threshold value in accordance with the page-by-page data such as histogram signal of the whole. Therefore, using CPU8, the histogram of density, etc. is created from the image memory 5, and based on the histogram, the recognition signal is corrected. By reducing erroneous recognition in this way and improving the accuracy of reference density or black, white detection, etc. at the time of microrecognition correction, it is possible to improve the accuracy of image processing results.

Now discussion will be made on a method for improving the accuracy of the region recognition signal by setting the character mode, photograph mode, and other image modes at the operating section and changing the judgment threshold value in accordance with this setting. That is, the character mode and photograph mode are set at the operating section (control panel) 11, and the recognition judgment threshold value at CPU 8 is changed. For example, recognition parameters are changed in such a manner that the character on the screened halftone background is emphasized and recognized for easy reading of the character at the time of character mode. Furthermore, changes will be made to add the γ characteristics to the recognition signal so that the character is outputted thick. In the photograph mode, the high-pass emphasis is reduced to eliminate rough feeling, and the γ characteristics are kept as much as faithful to suppress color fluctuations. By improving the accuracy of the region signal in this way, it becomes possible to improve the accuracy of the image processing results.

By providing this kind of parameter processing, even when the image is printed by a plurality of image forming apparatus in accordance with the same image information, it is possible to obtain printing results with comparatively less variations in the printing finish. That is, in the compression processing course, degradation of picture quality cannot be avoided, and picture quality improving processing must be carried out at the time of depression, but by storing the parameters at that time as storage control signals corresponding to the image information and enabling dynamic change by the information, the high picture quality in compliance with the relevant original document types is obtained even when the original document is fed by ADF (Auto Document Feeder). It is also possible to meet the picture quality mode set for each original document at the control panel.

Referring now to the memory copying functions, a method for improving the efficiency of copying functions by varying the resolution between read image information and outputted image information will be discussed. That is, by lowering the resolution of the read image information from the resolution of the outputted image information, it becomes possible to increase the speed of recognition modification processing and reduce the memory capacity required for storing the image information and recognition signals.

<Second Embodiment>

Figure 2:
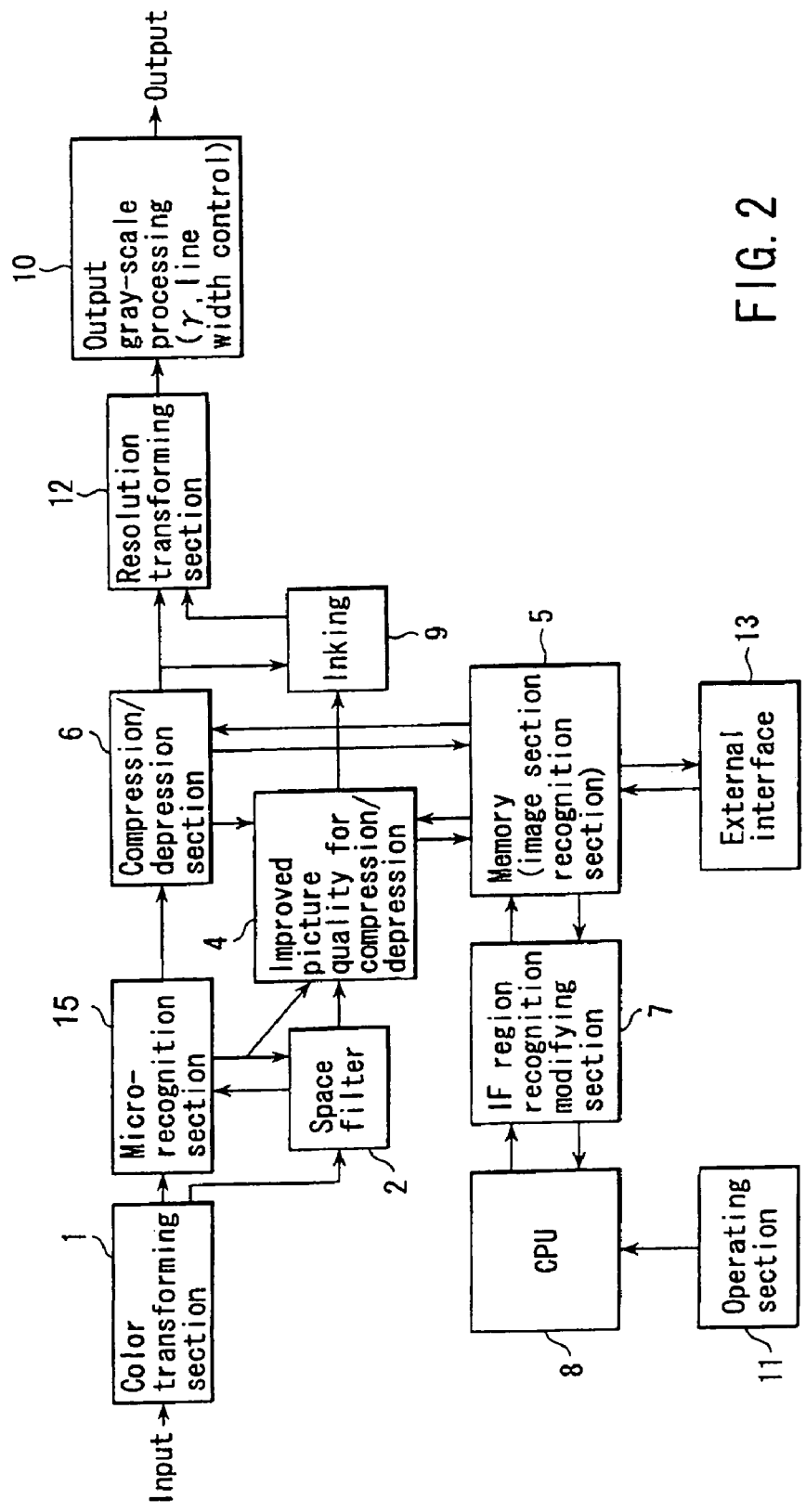
FIG. 2 is a block diagram showing a configuration example of a second embodiment according to the present invention.

A second embodiment intends to reduce the cost of the image processing circuit by adding a resolution transformation section for transforming the resolution with respect to the image processing apparatus according to the first embodiment and making the use of the resolution transformation. FIG. 2 is a block diagram showing a configuration example of the second embodiment, in which the image processing apparatus is characterized in that it is clarified that the neighborhood recognition section is the micro recognition section 15 and the resolution transforming section is located between the inking section 9 and the output gray-scale processing section 10.

For many of the natural pictures, nearly satisfactory picture quality is obtained from the visual viewpoint as far as the image is of 8-bit gray scale number (256 gradations) at 300 dpi resolution. On the other hand, for the character image, binary to ternary images are said to be required at 600 dpi. Therefore, it is considered to read the image input at 400 dpi at 256 gradations, use a printer at 600 dpi for the output, and output the image by providing gray scale processing. By doing so, the line buffer capacity for processing can be greatly reduced in the apparatus cost in image processing. However, simply transforming the resolution may lose the sharpness of the character image and may result in inconvenience such as batter, etc. depending on characters.

Consequently, the image signal entered, for example, at 400 dpi and inked as shown in FIG. 1 has the resolution transformed to 600 dpi at the resolution transforming section newly shown in FIG. 2, and sent to the output gray scale processing section 10.

In such event, the resolution transforming technique is changed over by the region recognition signal. To say specifically, the resolution transforming section 12 intends to transform the resolution by the space filter and linear transformation. The signal recognized as the character section by the recognition signal has the high-pass component emphasized by the space filter 2 and has the resolution transformed by linear interpolation. The photograph section has the high-pass component not so much emphasized in the space filter 2 by the recognition signal and has the resolution transformed by linear transformation. By doing this, even smaller characters can be resolution-transformed to 600 dpi without battering and the character can be reproduced highly in detail and the photographs remarkably faithfully. According to circumstances, it is suitable to merge the resolution transforming section 12 with the output gray scale processing section 10.

<Third Embodiment>

Figure 3:
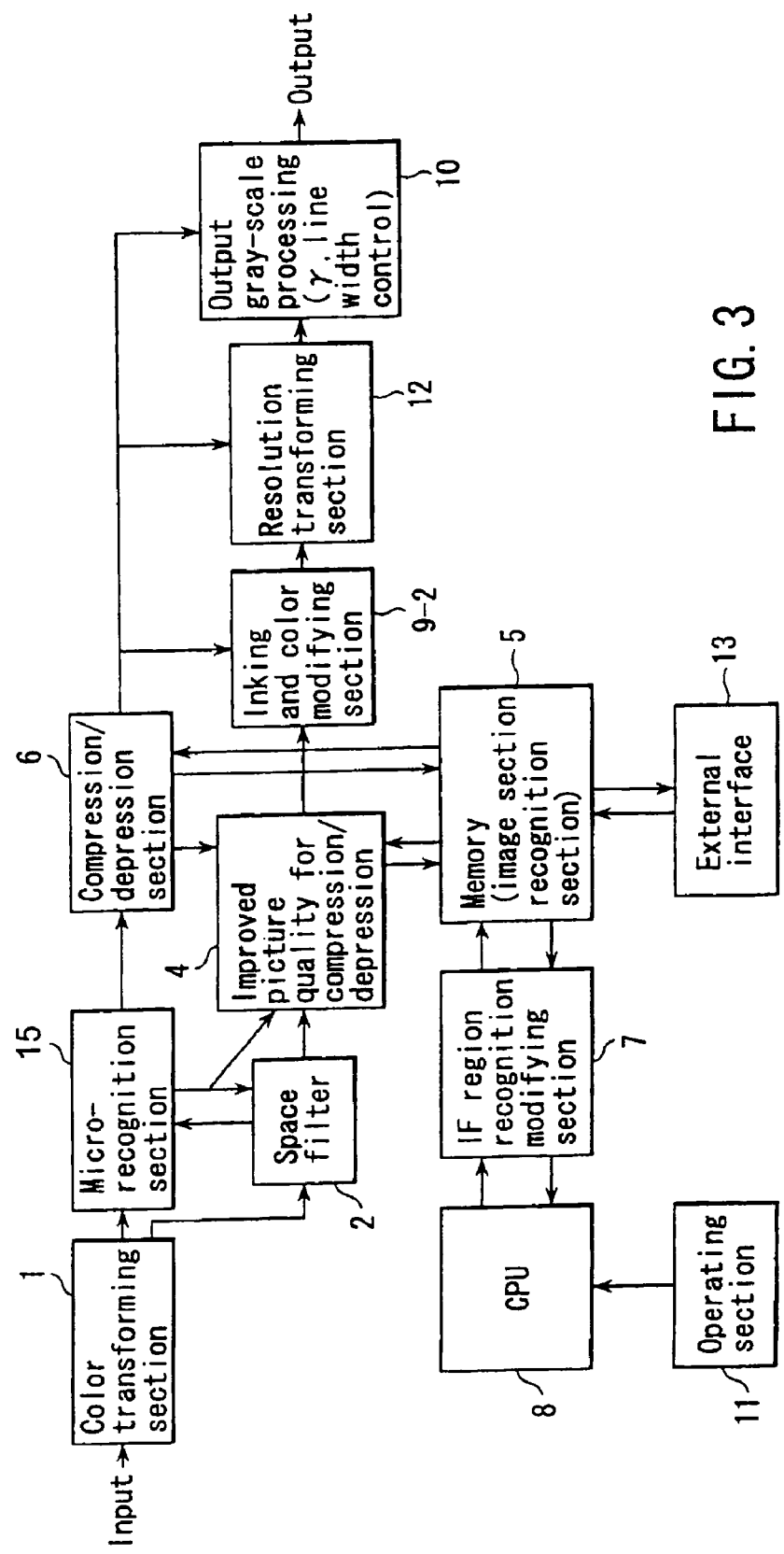
FIG. 3 is a block diagram showing a configuration example of a third embodiment according to the present invention.

A third embodiment intends to obtain the image suited for the user requirements by adding color modification functions to inking processing in the image processing apparatus of the first embodiment and modifying the color tone of the image in accordance with the region recognition signal and image mode setting by the operating section 11. FIG. 3 is a block diagram showing the configuration example of the third embodiment. In this drawing, an inking and color modifying section 9-2 with the color modifying function combined with the inking section 9 is installed.

Now, for example, the solid section of characters in the image information requires nearly complete solid output, while the high density section of the photograph requires to express the density naturally without battering. In such event, there was an inconvenience in that when the color characteristics are matched with the character, the photograph is expressed somewhat battered, and when the color characteristics are matched with the photograph, clearness is lost for the character.

According to macro recognition, the character region and the photograph region are recognized nearly accurately, respectively. Therefore, same as the embodiment of FIG. 1, the image region recognition signal and the image signal are depressed and obtained, respectively, and supplied to the inking and color modifying section 9-2. Now, at the color modifying section, color transformation is carried out in such a manner that the character section is clear and the photograph section is given the natural gray scale free of battering. Because this color is originally transformed to the YMC signal and is not required to be changed in a full scale, the required color transformation is possible by changing, for example, the lower 4 bits only with the upper 4 bits held intact. By this method, faithful color modification is possible in a small-scale circuit.

By the way, by setting the image mode by the use of the operating section 11, it is suited for setting such as, for example, changing the color of the character section only more vividly at the time of character mode setting. By combining with the mode setting by the operating section 11, more effective color reproduction is enabled.

(Modification Example of the Third Embodiment)

For the modification example using the color modifying section 9-2, the following case is suitable.

That is, the page-by-page feature amount of the image information is found, and based on this, recognition is made as to whether the image information is black and white image by, for example, the micro recognition section 15. When the image information is recognized as the black and white image, the region recognition signal stored is modified on the basis of the black and white image by the interface region recognition modifying section 7. Based on this modified region recognition signal, the image information is transformed to the black and white image, modified and outputted by the inking and color modifying section 9-2.

According to this method, efficient color transformation processing is possible in accordance with the color of the image information page by page. That is, when the image information is stored first time in the image memory, it is difficult to grasp the feature amount page by page and therefore, it is stored as the color image information to secure the recognition ratio, and when it is transferred to the electronic sorting apparatus or image forming apparatus, the image information is sent as black and white information, and the transfer efficiency is thereby achieved.

It is also possible to improve the high picture quality by grasping the page-by-page feature amount of color information, extracting the feature amount such as a person image, scenery image, foods, flowers, etc., and modifying colors accordingly.

This color transformation processing may be carried out in compliance with the printing control signals after transforming it into printing control signal without directly responding to the region recognition signal.

<Fourth Embodiment>

Figure 4:
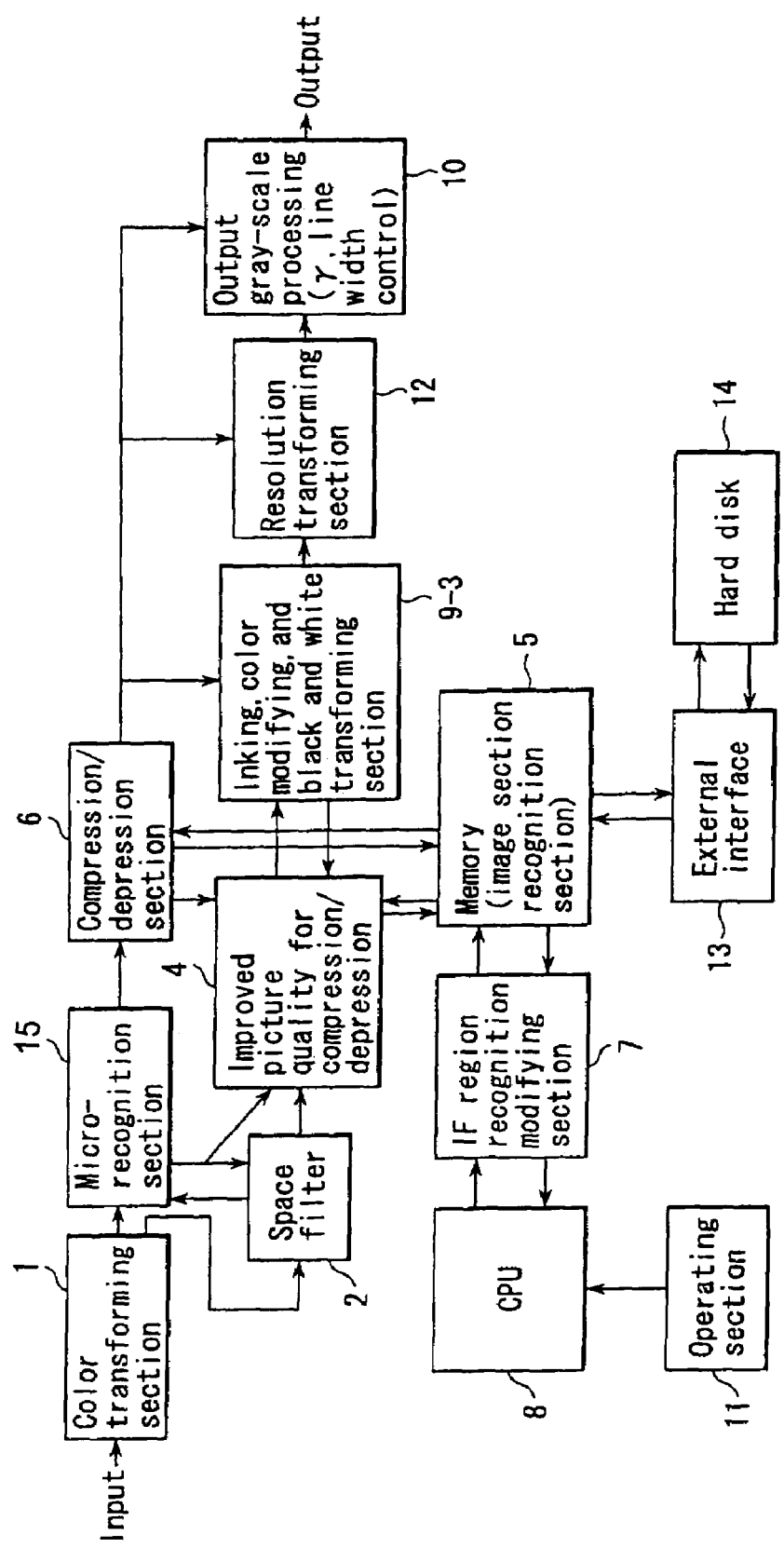
FIG. 4 is a block diagram showing a configuration example of a fourth embodiment according to the present invention.

A fourth embodiment shows an embodiment in which image processing of the image processing apparatus related to the first embodiment is carried out in electronic sorting. FIG. 4 is a block diagram showing the configuration example of the fourth embodiment, and in this figure, what differs from the embodiment of FIG. 1 from the structural viewpoint is that a hard disk 14 is installed to the outside via the external interface 13, and furthermore, black and white transformation is added as the extension of the color modifying function to the inking and color modifying section, and an inking, color modifying, and black-and-white transformation section 9-3 is installed.

In this FIG. 4, the signal flows same as in the case of the embodiment of FIG. 1, that is, the image signal and recognition signal are stored in the memory element 5, and the recognition signal modified by the macro region recognition by CPU8 is stored in the memory element 5. Then, these signals are stored in the hard disk 14 via the external interface 13.

When the image information is stored by the fixed-length compression system in the image section of the memory element 5, compressing with this external interface 13 provided with variable length compression functions can store the large-volume of image data efficiently in the hard disk 14.

In such event, as is the case of the embodiment of FIG. 2, storing the compressed image of the image data at the time of low resolution in the hard disk 14 with the input resolution lowered and the output resolution increased enables the storage of a large volume of comparatively good picture quality image. That is, the input is read at 400 dpi and processed in the same manner as is the case of FIG. 1, and compressed image data and the recognition signal are stored in the hard disk 14. Thereafter, the compressed image data and image-region recognition signal are read out and stored in the image section of the memory element 5, and depressed at the compression/depression section 6 as is the case of FIG. 1, inked at the inking, color modifying, and black-and-white transforming section 9-3, supplied to the resolution transforming section 12, and transformed to 600 dpi in the same manner as FIG. 2 for improved resolution. And by output gray scale processing by the output gray scale processing section 10, the image information with highly detailed picture quality is obtained. This is supplied to the external printer, etc. not illustrated, and detailed and high picture quality image printing is achieved.

By the way, when the image data is judged to be white and black image by macrorecognition, the color modification functions are expanded at the inking, color modifying, and black-and-white transforming section 9-3 to transform black and white, and this black and white transformed image is outputted. When the image data is stored in the external memory such as hard disk 14, since a better compression ratio is achieved by black-and-white transformation, it is suited to provide the black-and-white (or monochrome) transformation function to the external interface 13 and to send and store the data to and in the hard disk 14 after monochrome transformation. In such event, if the data is stored in the image memory by a fixed-length compression system, compressing the data with the variable length compression function provided to this external interface 13 achieves still more efficient storage.

In this way, when the electronic sorting function is equipped, the efficiency of the processing speed and compression ratio can be improved by storing the image information and region recognition information or printing control signal, etc. in the hard disk, etc. by varying compression methods, respectively.

<Fifth Embodiment>

Figure 5:
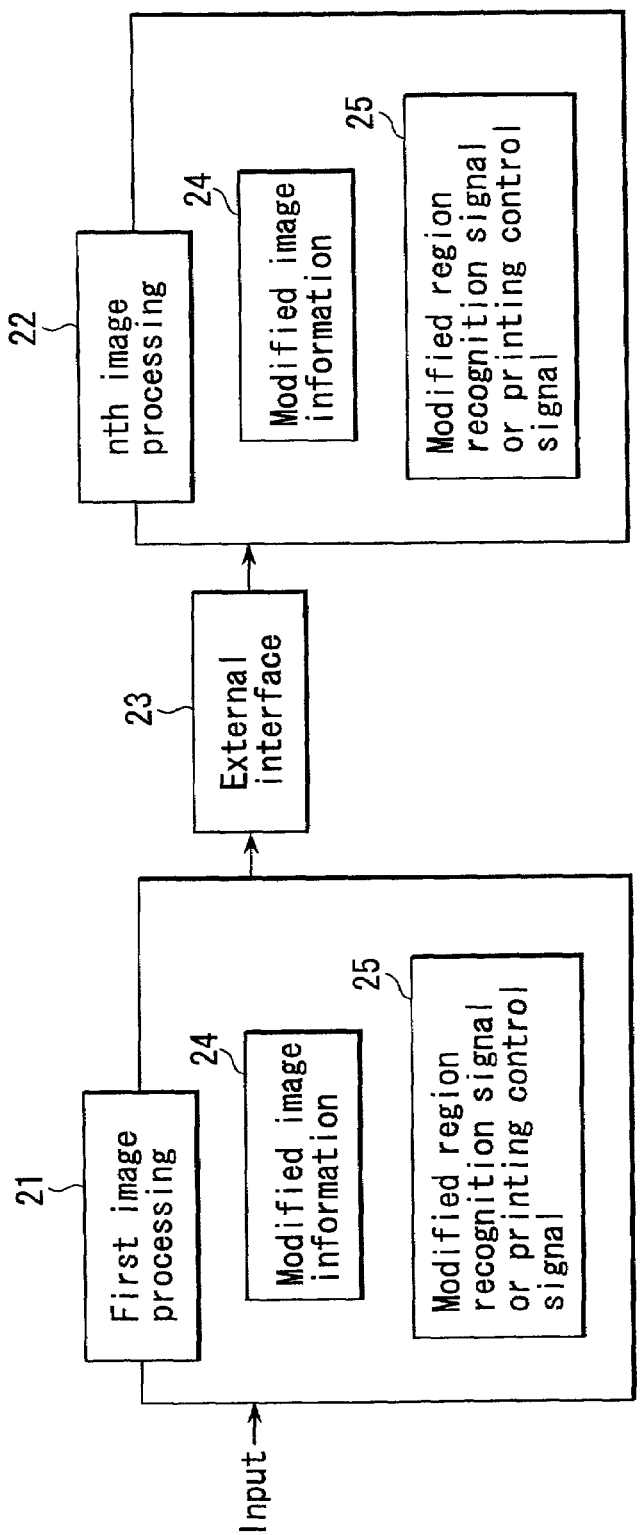
FIG. 5 is a block diagram showing a configuration example of a fifth embodiment according to the present invention.

A fifth embodiment shows the case in which a plurality of copying machines are connected to the image processing apparatus related to the first embodiment and high-speed copying is achieved. FIG. 5 is a block diagram showing the configuration example of the fifth embodiment. In this drawing, the basic image signal processing and action are same as those of FIG. 1, and what differs from FIG. 1 is that the information present in the image section of the memory element 5 of the first copying machine is sent to the second copying machine and outputted. By this, the output of a plurality of copies can be doubled, and thereby the increased speed of image forming is achieved.

In this drawing, the modified image information section 24 and modified region recognition signal or printing control signal 25 are stored in the memory element by the processing same as FIG. 1 by the first image processing section 21. This signal is sent to the nth image processing section 22 by the external interface 23, and the modified image information is stored in the modified image information section 24 and the memory element 5. If the image information and its region recognition signal or printing control signal are stored in the memory element 5 in this way, as is the case of FIG. 1, depression processing, inking, and other processing are carried out and the information and signals are outputted. That is, by carrying out tandem printing in which information and signals are outputted from the first and nth copying machines, respectively, increased speed is achieved.

<Sixth Embodiment>

Figure 6:
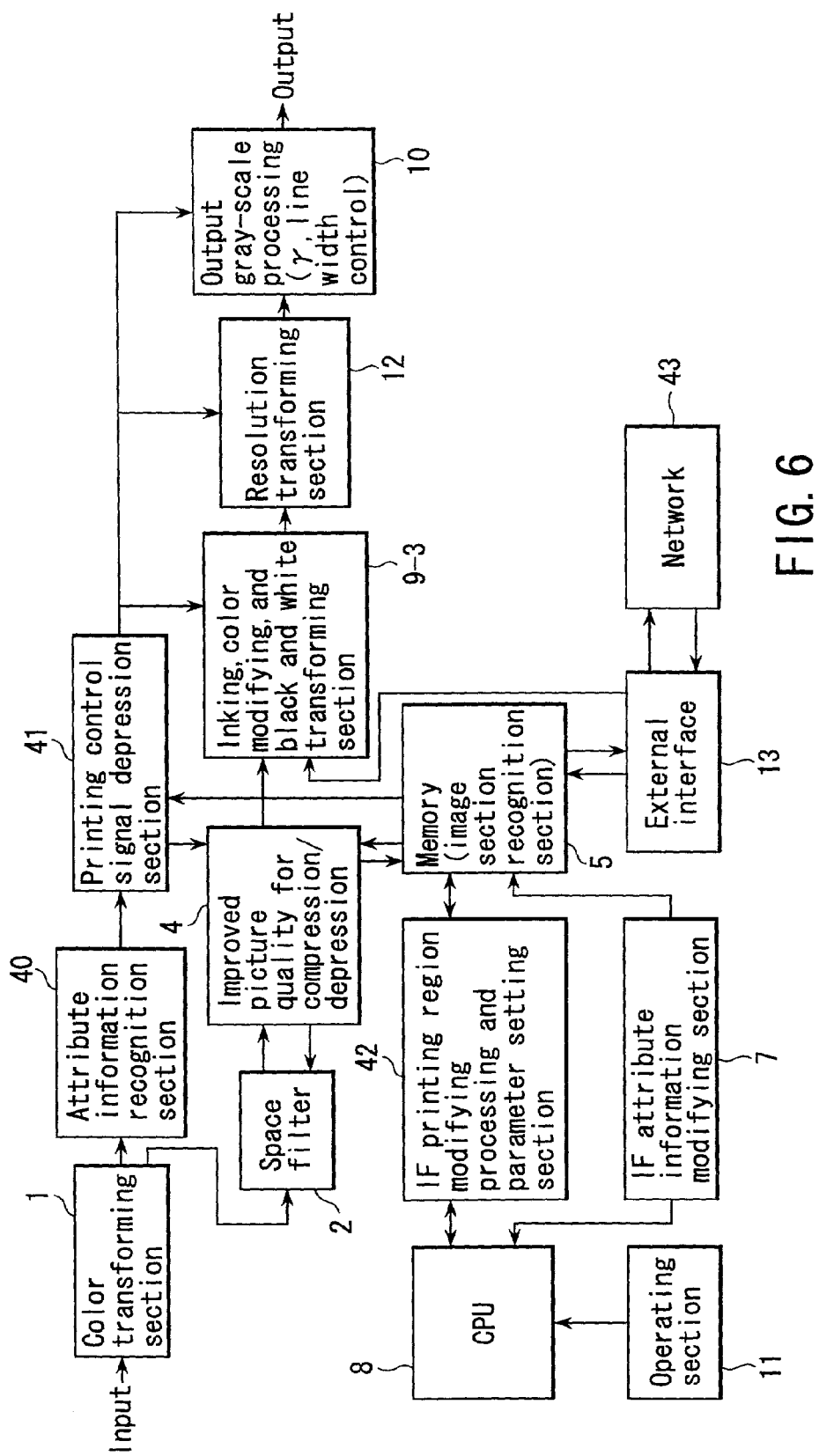
FIG. 6 is a block diagram showing a configuration example of a sixth embodiment according to the present invention.

A sixth embodiment shows the case in which the printing control signal is created so that high picture quality is obtained at the time of printing in the image processing apparatus related to the first embodiment. FIG. 6 is a block diagram showing the configuration example of the sixth embodiment. In this drawing, the micro recognition section 15 is designated as an attribute information recognition section 40, the compression/depression section 6 becomes the printing control signal depression section 41, the interface region recognition modifying section 7 is altered to an interface printing region modifying processing and parameter setting section 42, and the apparatus is connected to the network 43 via the external interface 13, which are structural differences from the first embodiment.

In FIG. 6, the image data and attribute codes are sent by the network 43 connected to the interface 13. In general, the printer image data is transformed from the code information to the raster data by RIP processing. In such event, the attribute information as to what kind of image data it is, such as text data, graphic data, bit map data, etc. can be distinguished when it is raster-transformed. This attribute information and actual image data are sent, respectively. These signals are taken in by the external interface 13 and stored in the memory element 5. The attribute information in such event is the attribute information that depends on the code information as to which application is used for creating the original image. This attribute information is not always suitable when it is seen as the printing control signal.

For example, in the case of the character on the screened halftone image, both character and screened halftone may sometimes be processed as graphic data by RIP processing. In such event, they are half-tone-processed and the character profile may become notched. Therefore, they are entered in the interface attribute information modifying section 7 and CPU8, and as described in FIG. 1, the character edge is detected from the image data, and the attribute information is modified with the character edge section designated as the character section. This modified data is returned again to the memory element 5 via the interface printing region modifying processing and parameter setting section 42, and the image data is further depressed, the high-pass is emphasized as required by the recognition signal, and inked by the inking, color modifying, and transforming section 9-3 to correct color variations caused by the printer. Thereafter, processing same as FIG. 1 takes place and the image information is outputted. When the printing control signal is compressed, depression is carried out by the depression section 6. By doing so, the image information with still better picture quality can be supplied to the external printer, etc.

Still better picture quality of the image information is obtained by processing the image information by image processing parameters which differ in the character and photograph regions, respectively, in the inking, color modifying, and transforming section 9-3. In such event, the region recognition signal is supplied and processed at the inking, color modifying, and transforming section 9-3 or resolution converting section 12, or output gray-scale processing section (γ, line width control) 10 in order to achieve still higher picture quality.

Furthermore, using FIG. 5, a case of printing at high speed by sending the image data to a plurality of image forming apparatus will be described. When the image data is outputted by a plurality of printers, colors may be varied in accord with printers. Therefore, the identical image data is sent to a plurality of image forming apparatus, at least to each region that corresponds to the identical attribute, the image is formed by each of the image forming apparatus, and the color characteristics of the sample formed are read. Based on the information read, parameters of color modifying section of each image forming apparatus are modified. That is, parameters of the inking, color modifying, and transforming section 9-3 are modified by the network 43 via the external interface 13.

That is, in this example, it is desirable that color characteristics match each other at each region (character, photograph) of a plurality of image forming apparatus when tandem image is formed, where the image information is sent and simultaneously outputted at a plurality of image forming apparatus, because color reproduction characteristics slightly vary in the character region and the photograph region. Therefore, by storing the color characteristics of each region of each image forming apparatus or the difference in advance in each apparatus, and achieving the improved picture quality in conformity to the improved picture quality control signal, the color characteristics of each region (character and photograph) of a plurality of image forming apparatus are coincided with one another.

In this way, it becomes possible to consistently match the color characteristics by grasping the color characteristics of each of a plurality of image forming apparatus and the color characteristics of each region (character and photo regions) in the tandem image formation using a plurality of apparatus and varying the color characteristics that correspond to each region of each apparatus.

By various embodiments recited as above, those skilled in the art can put the present invention into practice. However, various modified examples of these embodiments are easily clear to those skilled in the art and it is possible to apply the principle disclosed herein in a broad sense can be applied to various embodiments even if the people have no inventive capabilities. In this way, as many apparently widely different embodiments of this invention may be made without departing from the spirit and scope thereof, it is to be understood that the invention is not limited to the specific embodiments as described above.

As described above in detail referring to drawings, according to the present invention, it is possible to provide an image processing apparatus that can obtain high-picture quality image information at quick processing speed because a plurality of scanning are no longer necessary as is the case of the conventional apparatus by improving the picture quality of the image information in compliance with the region recognition signal with one screen of image data stored and modified.

Because the picture quality is improved for the image data stored, the data can be recognized and has the picture quality improved only by one scanning, and the high processing speed is thereby achieved.

It is also possible to reduce the memory capacity of the page memory for storing the image data while increased speed of modification processing of the region recognition signal is achieved by varying the resolution in accord with the image information and region recognition signal.

What is claimed is:

1. An image processing apparatus comprising:
   a first memory section which stores image information given in a memory;
   a micro region recognition section which creates a micro recognition signal of the image information simultaneously with storing the image information in the first memory section;
   a second memory section which stores the micro recognition signal created by the micro region recognition section in the memory;
   a macro region recognition section that carries out layout analysis based on the micro recognition signal;
   a recognition signal modifying section which reads out and modifies the micro recognition signal stored in the second memory section based on the layout analysis carried out by the macro region recognition section; and
   an improved picture quality modifying section which reads out the image information stored in the first memory section and modifies the image information in accordance with the micro recognition signal modified by the recognition signal modifying section.

2. The image processing apparatus according to claim 1, wherein the first memory section includes a memory section which compresses the image information and stores the image info in the memory,
   and the improved picture quality modifying section, reads out the image information which the first memory section stores, and modifies the image information in compliance with the micro recognition signal which the recognition signal modifying section modifies when the image information is depressed.

3. The image processing apparatus according to claim 1, wherein the improved picture quality modifying section transforms the micro recognition signal which the second memory section stores into a printing control signal, and reads out and modifies the image information which the first memory section stores in compliance with the printing control signal.

4. The image processing apparatus according to claim 1, wherein the recognition signal modifying section reads out the micro recognition signal which the second memory section stores and modifies the micro recognition signal at a resolution different from the resolution of the image information.

5. The image processing apparatus according to claim 1, wherein the improved picture quality modifying section is an output gray-scale processing section which reads the image information which the first memory section stores and modifies the image information of higher resolution than the resolution of the image information in compliance with the micro recognition signal which the recognition signal modifying section modified.

6. The image processing apparatus according to claim 1, wherein the first memory section has a first compression section which compresses the image information and stores the image information in the memory, and further has a second compression section which compresses the image information differently from the first compression section and stores the image information in the memory.

7. The image processing apparatus according to claim 1, where the recognition signal modifying section creates page-by-page data of the image information and modifies the micro recognition signal read from the second memory section in compliance with the page-by-page data.

8. The image processing apparatus according to claim 1, wherein the recognition signal modifying section establishes an image mode including at least character or photograph, and modifies the micro recognition signal read from the second memory section in compliance with the established image mode.

9. The image processing apparatus according to claim 8, wherein
   the improved picture quality modifying section reads out the image information which the first memory section stores and modifies a color tone of the image information in compliance with the micro recognition signal modified by the recognition signal modifying section.

10. The image processing apparatus according to claim 1, wherein the improved picture quality modifying section reads out the image information which the first memory section stores and the micro recognition signal modified by the recognition signal modifying section, compresses and stores the image information and modified micro recognition signal in a storage unit different from the memory, further depresses and reads out the image information and modified micro recognition signal, and modifies the image information in compliance with the micro recognition signal modified by the recognition signal modifying section.

11. The image processing apparatus according to claim 1, wherein the first memory section includes a memory section which compresses the image information, and stores parameters for improved picture quality required after depression as recording control signals associated with a compressed image information in the memory,
    and the improved picture quality modifying section reads out the image information which the first memory section stores and the micro recognition signal modified by the recognition signal modifying section, compresses and stores the image information and modified micro recognition signal in a storage unit different from the memory, further depresses and reads out the image information and modified micro recognition signal, and modifies the image information in compliance with at least either of the micro recognition signal or the recording control signal modified by the recognition signal modifying section.

12. The image processing apparatus according to claim 1, further comprising:
    a micro recognition section which finds a page-by-page feature amount of the image information and recognizes whether the image information is a white and black image or not in compliance with the feature amount;
    a modifying section which modifies the micro recognition signal stored in the second memory section in compliance with being the black and white image when the recognition section recognizes the image information as the black and white image; and
    a color modifying section which transforms the image information into a black and white image, and modifies and outputs an image in compliance with the micro recognition signal modified by the modifying section.

13. The image processing apparatus according to claim 1, further comprising:
- a micro recognition section which finds a page-by-page feature amount of the image information and recognizes whether the image information is a black and white image or not in compliance with the feature amount;
- a modifying section which transforms the region recognition signal stored in the second memory section into a printing control signal when the recognition section recognizes the image information as a black and white image; and
- a color modifying section which transforms the image information into a black and white image, and modifies and outputs an image in compliance with the printing control signal transformed by the modifying section.

14. The image processing apparatus according to claim 1, further comprising:
- an external interface which transmits the micro recognition signal modified by the recognition signal modifying section and the image information modified by the improved picture quality modifying section to a plurality of image forming apparatuses.

15. The image processing apparatus according to claim 1, wherein the macro region recognition section recognizes a character section, a photograph section, and a screened halftone section of the image information.

16. The image processing apparatus according to claim 15, wherein the macro region recognition section removes the screened halftone noise and emphasizes the characters at the screened halftone image section.

* * * * *